United States Patent [19]
Saretzky

[11] Patent Number: 5,936,232
[45] Date of Patent: Aug. 10, 1999

[54] RAILWAY SAFETY SYSTEM HAVING A PASSENGER CAR DETECTION

[76] Inventor: Dimitri M. Saretzky, 5230 Kepler La., Springfield, Va. 22151

[21] Appl. No.: 08/897,908

[22] Filed: Jul. 21, 1997

[51] Int. Cl.$^6$ .................................................. G01V 9/04
[52] U.S. Cl. .......................................... 250/221; 105/341
[58] Field of Search ................................ 250/221, 559.4; 340/925, 931, 555–557; 105/341, 331, 333

[56] References Cited

U.S. PATENT DOCUMENTS 4,656,950  4/1987  Rhoton ..................................... 105/341
5,226,370  7/1993  Templeton et al. ...................... 105/341

*Primary Examiner*—Que T. Le

[57] ABSTRACT

A railway safety system is provided for use in combination with a railway, a ledge situated adjacent the railway, and a passenger car with at least one access door. The present invention includes a vertical wall situated on the ledge and at least one transparent sliding door adapted to open upon the receipt of an open door signal and to close upon the receipt of a close signal. Next provided is a control mechanism connected to the sliding and adapted to selectively transmit the door open signal and the door close signal to the sliding doors for allowing passengers to enter the passenger car only when safe.

4 Claims, 2 Drawing Sheets

RAILWAY SAFETY SYSTEM HAVING A PASSENGER CAR DETECTION

BACKGROUND OF THE INVENTION

1. Field of the Invention

The present invention relates to automatic elevator doors and more particularly pertains to a new RAILWAY SAFETY SYSTEM for preventing a person from falling off a ledge adjacent a passenger car railway.

2. Description of the Prior Art

The use of automatic elevator doors is known in the prior art. More specifically, automatic elevator doors heretofore devised and utilized are known to consist basically of familiar, expected and obvious structural configurations, notwithstanding the myriad of designs encompassed by the crowded prior art which have been developed for the fulfillment of countless objectives and requirements.

Known prior art automatic elevator doors include U.S. Pat. No. 4,551,944; U.S. Pat. No. 5,422,552; U.S. Pat. No. 4,698,938; U.S. Pat. No. 4,656,950; U.S. Pat. No. 4,546,845; and U.S. Pat. No. Des. 271,812.

In these respects, the RAILWAY SAFETY SYSTEM according to the present invention substantially departs from the conventional concepts and designs of the prior art, and in so doing provides an apparatus primarily developed for the purpose of preventing a person from falling off a ledge adjacent a passenger car railway.

SUMMARY OF THE INVENTION

In view of the foregoing disadvantages inherent in the known types of automatic elevator doors now present in the prior art, the present invention provides a new railway safety system SYSTEM construction wherein the same can be utilized for preventing a person from falling off a ledge adjacent a passenger car railway.

The general purpose of the present invention, which will be described subsequently in greater detail, is to provide a new railway safety system apparatus and method which has many of the advantages of the automatic elevator doors mentioned heretofore and many novel features that result in a new railway safety system which is not anticipated, rendered obvious, suggested, or even implied by any of the prior art automatic elevator doors, either alone or in any combination thereof.

To attain this, the present invention generally comprises a transparent vertical wall situated on a ledge adjacent a passenger car railway. At least one transparent sliding door is adapted to open upon the receipt of an open door signal and to close upon the receipt of a close signal. Next provided is an obstruction sensor including a light beam transmitter situated on a first side of the sliding door. In use, the transmitter is adapted to continuously transmit a light beam. Associated therewith is a light beam receiver situated on a second side of the sliding door opposite the transmitter for transmitting an obstruction signal upon the lack of receipt of the light beam. As shown in FIGS. 1 & 2, a passenger car detection switch is provided. Such switch is situated adjacent the railway for transmitting a car present signal only during the detection of a passenger car on the railway. Finally, control means in the form of control circuitry is connected to the sliding door, obstruction sensor, and passenger car detection switch. In use, the control means is adapted to transmit the door open signal to the sliding door upon the receipt of the car present signal for a predetermined amount of time. The control means further functions to transmit the door close signal to the sliding door upon the lack of receipt of the car present signal. Upon the receipt of the obstruction signal, the control means immediately transmits only the open door signal to the sliding door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new railway safety system apparatus and method which has many of the advantages of the automatic elevator doors mentioned heretofore and many novel features that result in a new railway safety system which is not anticipated, rendered obvious, suggested, or even implied by any of the prior art automatic elevator doors, either alone or in any combination thereof.

It is another object of the present invention to provide a new railway safety system which may be easily and efficiently manufactured and marketed.

It is a further object of the present invention to provide a new railway safety system which is of a durable and reliable construction.

An even further object of the present invention is to provide a new railway safety system which is susceptible of a low cost of manufacture with regard to both materials and labor, and which accordingly is then susceptible of low prices of sale to the consuming public, thereby making such railway safety system economically available to the buying public.

Still yet another object of the present invention is to provide a new railway safety system which provides in the apparatuses and methods of the prior art some of the advantages thereof, while simultaneously overcoming some of the disadvantages normally associated therewith.

Still another object of the present invention is to provide a new railway safety system for preventing a person from falling off a ledge adjacent a passenger car railway.

Even still another object of the present invention is to provide a new railway safety system that includes a vertical wall situated on a ledge and at least one transparent sliding door adapted to open upon the receipt of an open door signal and to close upon the receipt of a close signal. Next provided is a control mechanism connected to the sliding and adapted to selectively transmit the door open signal and the door close signal to the sliding doors for allowing passengers to enter a passenger car only when safe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
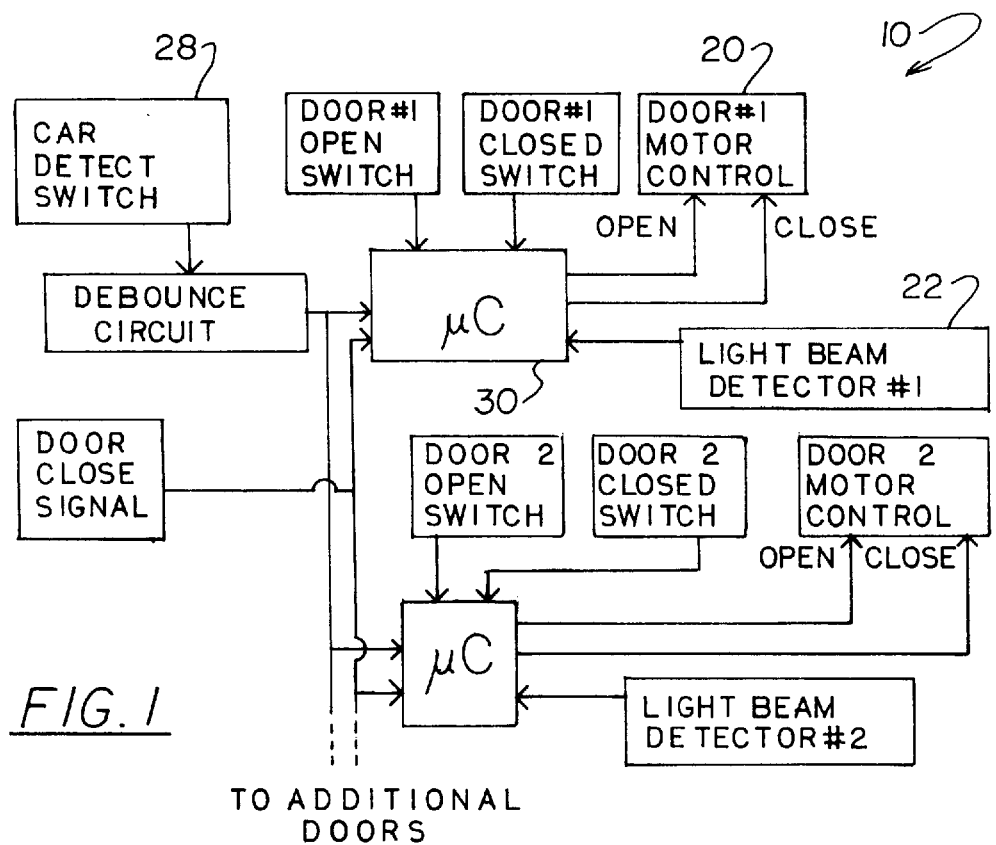
FIG. 1 is a schematic diagram of a new railway safety system according to the present invention.

With reference now to the drawings, a new railway safety system embodying the principles and concepts of the present invention and generally designated by the reference numeral 10 will be described.

As shown in the Figures, the system 10 of the present invention is adapted for use in combination with a railway 12, a ledge 14 situated adjacent the railway, and a passenger car 16 with at least one access door. The system 10 first includes a transparent vertical wall 18 situated on the ledge to work in conjunction with the doors to prevent people from falling off of the ledge. At least one transparent sliding door 20 is adapted to open upon the receipt of an open door signal and to close upon the receipt of a close signal. To provide a status of each sliding door and thus a source of feed back, a door open switch and a door close switch is associated therewith. It should be noted that the transparent vertical wall and sliding door reside generally within a common vertical plane. In the preferred embodiment, the wall extends along the entire length of the ledge.

Next provided is an obstruction sensor 22 including a light beam transmitter situated on a first side of the sliding door. In use, the transmitter 24 is adapted to continuously transmit a light beam. Associated therewith is a light beam receiver 26 situated on a second side of the sliding door opposite the transmitter for transmitting an obstruction signal upon the lack of receipt of the light beam.

Figure 2:
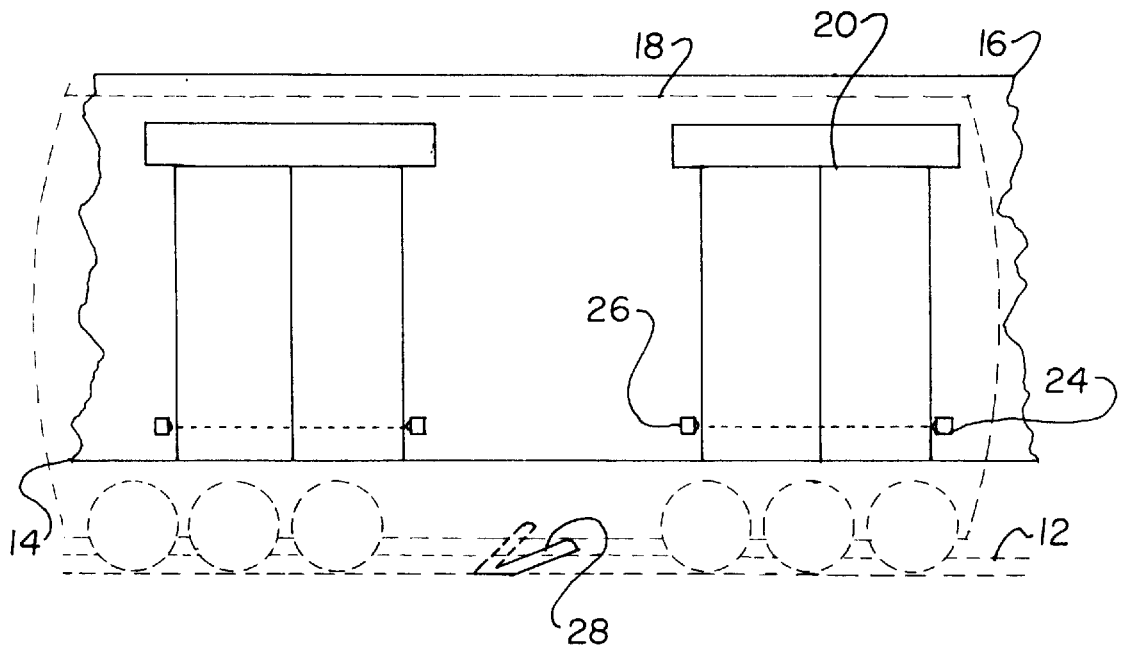
FIG. 2 is a side view of the present invention in use.
Figure 3:
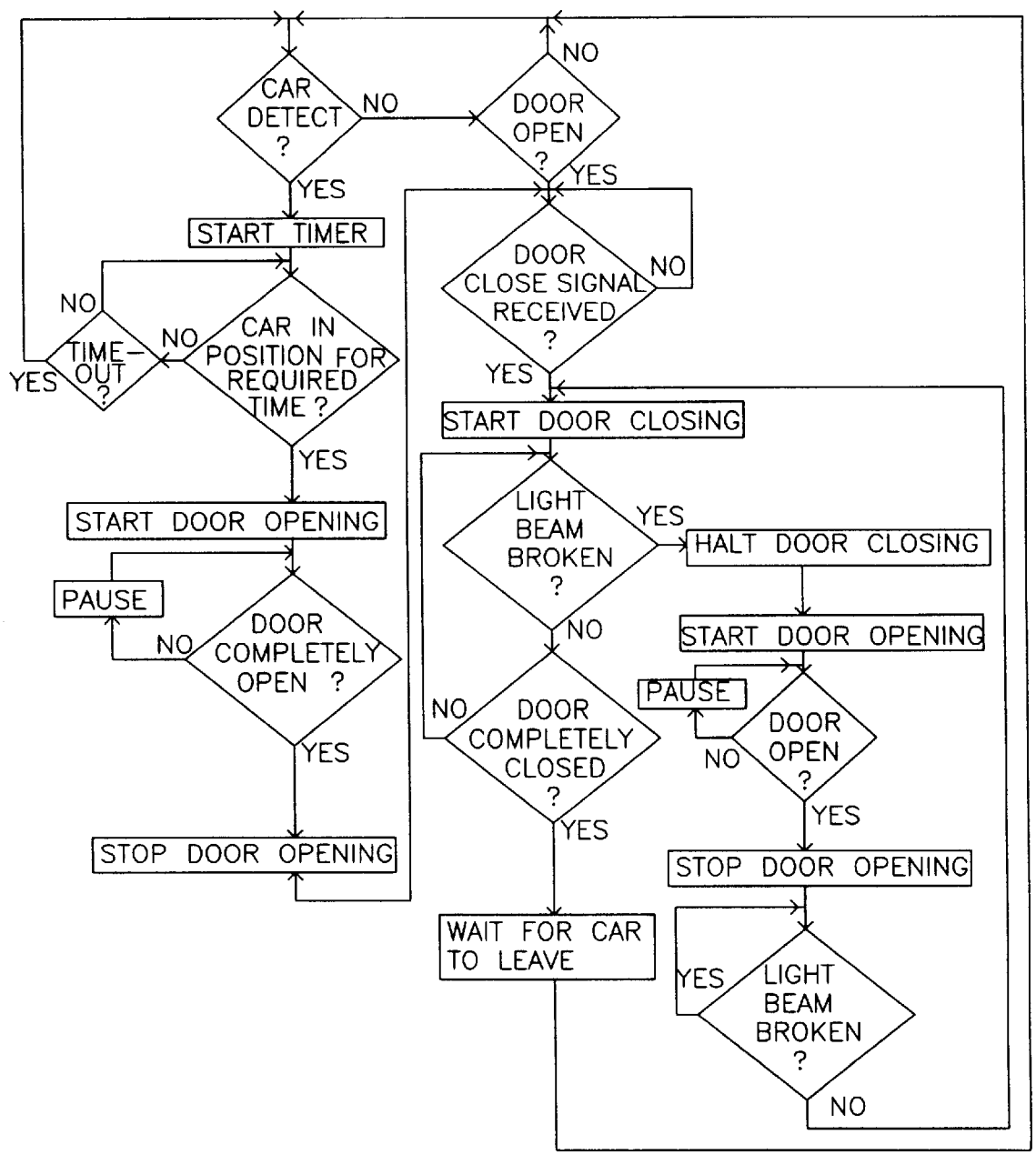
FIG. 3 is a flow chart delineating the function of the various components of the present invention.

As shown in FIGS. 1 & 2, a passenger car detection switch 28 is provided. Such switch is situated adjacent the railway for transmitting a car present signal only during the detection of a passenger car on the railway. As shown in FIG. 2, such switch comprises an upwardly extending tab which is adapted to be biased downwardly when the passenger car is present thereby effecting the transmission of the car present signal. In particular, as seen in FIG. 2, a lower surface of the passenger car abuts the switch, pushing the switch downwardly. The switch is held down by the passenger car until the passenger car pulls away.

Finally, control means 30 in the form of control circuitry is connected to the sliding door, obstruction sensor, and passenger car detection switch. Wires of a type known in the art may be used to transport an electric signal from the switch to the control circuitry. In use, the control means is adapted to transmit the door open signal to the sliding door upon the receipt of the car present signal for a predetermined amount of time. A timer is provided to facilitate such operation. It is important the predetermined amount of time equal the time required for the passenger car to come to a stop.

The control means further functions to transmit the door close signal to the sliding door upon the lack of receipt of the car present signal. As such, the doors are automatically closed when the passenger car departs. To ensure that the door closes immediately upon the departure of the passenger car, the car detection switch is situated such that it will always be positioned under a rear of the passenger car when it is parked adjacent the ledge. Upon the receipt of the obstruction signal, the control means immediately transmits only the open door signal to the sliding door. This prevents a user from being crushed by the door.

In use, the passenger car stops adjacent the ledge so as to align the access doors thereof with the siding doors. To facilitate such alignment, a marker may be positioned on the ledge to function as a reference point for allowing a driver of the passenger to stop at the proper location. It should be noted that the number of sliding doors should equal the quantity of access doors of a single passenger car. Also, each sliding door has an obstruction sensor.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A railway safety system for use in combination with a railway, a ledge situated adjacent the railway, and a passenger car with at least one access door, the railway safety system comprising:

a vertical wall means situated on the ledge;

at least one sliding door positioned in an opening of the vertical wall, the door being adapted to open upon the receipt of an open door signal and to close upon the receipt of a close signal;

a passenger car detection switch situated adjacent the railway for transmitting a car present signal only during the detection of a passenger car on the railway; and control means connected to the sliding and adapted to transmit the door open signal upon the receipt of the car present signal for a predetermined amount of time and to transmit the door close signal to the sliding door upon the lack of receipt of the car present signal.

2. A railway safety system for use in combination with a railway, a ledge situated adjacent the railway, and a passenger car with at least one access door, the railway safety system comprising, in combination:

a transparent vertical wall situated on the ledge;

at least one transparent sliding door positioned in an opening of the vertical wall, the door being adapted to open upon the receipt of an open door signal and to close upon the receipt of a close signal;

an obstruction sensor including a light beam transmitter situated on a first side of the sliding door and adapted to continuously transmit a light beam and a light beam receiver situated on a second side of the sliding door opposite the transmitter for transmitting an obstruction signal upon the lack of receipt of the light beam;

a passenger car detection switch situated adjacent the railway for transmitting a car present signal only during the detection of a passenger car on the railway; and control means connected to the sliding door, obstruction sensor, and passenger car detection switch, the control means adapted to transmit the door open signal to the sliding door upon the receipt of the car present signal for a predetermined amount of time, the control means further adapted to transmit the door close signal to the sliding door upon the lack of receipt of the car present signal, whereby upon the receipt of the obstruction signal, the control means functions to immediately transmit only the open door signal to the sliding door.

3. A railway safety system for use in combination with a railway, a ledge situated adjacent the railway, and a passenger car with at least one access door, the railway safety system comprising:

a vertical wall means situated on the ledge;

at least one sliding door positioned in an opening of the vertical wall, the door being adapted to open upon the receipt of an open door signal and to close upon the receipt of a close signal;

said sliding door being transparent;

control means connected to the sliding door and adapted to selectively transmit the door open signal and the door close signal to the sliding doors; and a passenger car detection switch situated adjacent the railway for transmitting a car present signal only during the detection of a passenger car on the railway, wherein the control means is adapted to transmit the door open signal upon the receipt of the car present signal for a predetermined amount of time and to transmit the door close signal to the sliding door upon the lack of receipt of the car present signal.

4. A railway safety system as set forth in claim 3 and further including an obstruction sensor with a light beam transmitter situated on a first side of the sliding door and adapted to continuously transmit a light beam and a light beam receiver situated on a second side of the sliding door opposite the transmitter for transmitting an obstruction signal upon the lack of receipt of the light beam, wherein the control means is further adapted to immediately transmit the open door signal to the sliding door for preventing closing of the sliding door when a person is positioned between the sliding door and the vertical wall.

* * * * *